April 30, 1968     P. S. ECKHOFF     3,380,418

BAILING MACHINE

Filed June 22, 1965     2 Sheets-Sheet 1

INVENTOR
PAUL SHEPPARD ECKHOFF
BY
George P. Ziehmer
ATTORNEY

April 30, 1968 P. S. ECKHOFF 3,380,418
BAILING MACHINE

Filed June 22, 1965 2 Sheets-Sheet 2

INVENTOR
PAUL SHEPPARD ECKHOFF
BY George P. Ziehme
ATTORNEY

# United States Patent Office 3,380,418
Patented Apr. 30, 1968

3,380,418
BAILING MACHINE
Paul Sheppard Eckhoff, Oyster Bay, N.Y., assignor to American Can Company, New York, N.Y., a corporation of New Jersey
Filed June 22, 1965, Ser. No. 465,951
9 Claims. (Cl. 113—1)

ABSTRACT OF THE DISCLOSURE

A machine for inserting bails having cutting barbs at their ends into the bail ears of cans being conveyed along a runway. A pair of pressure members in lateral alignment with each other on opposite sides of the runway are moved through an operating stroke at high speed against the sides of a bail, the barbs of which are temporarily engaged on the bail ears so that the bails cut through the ears to permanently secure the bail to the can.

---

The present invention relates to can bailing machines and has particular reference to a machine for inserting barbed bails into the bail ears of cans by a straight pressing operation as the cans are conveyed along a runway.

In my copending patent application Ser. No. 383,469, now abandoned, I disclose an improved can carrying bail made from a generally semicircular piece of wire having its opposing ends bent inwardly toward each other and terminating in wedge-shaped barbs which are forcibly insertable into hollow bail ears which are attached to opposite sides of a can body.

The present invention covers a simple inexpensive machine for automatically inserting these barbs into the bail ears of the cans.

An object of the invention is the provision of a simple automatic machine for forcing can bails into bail ears by a simple pressure operation.

Another object is the provision of such a machine which embodies a minimum number of mechanical parts and which is quick acting and reliable in operation.

A still further object is the provision of such a machine which is capable of effecting the bail inserting operation while the can is moving through the machine without requiring that the can be stopped during the operation, thereby greatly simplifying the construction of the machine.

A still further object is the provision of a machine which can be easily installed in presently existing can runways.

Numerous other objects and advantages of the invention will be apparent as it is better understood from the following description, which, taken in connection with the accompanying drawings, discloses a preferred embodiment thereof.

Referring to the drawings.

Figure 1:
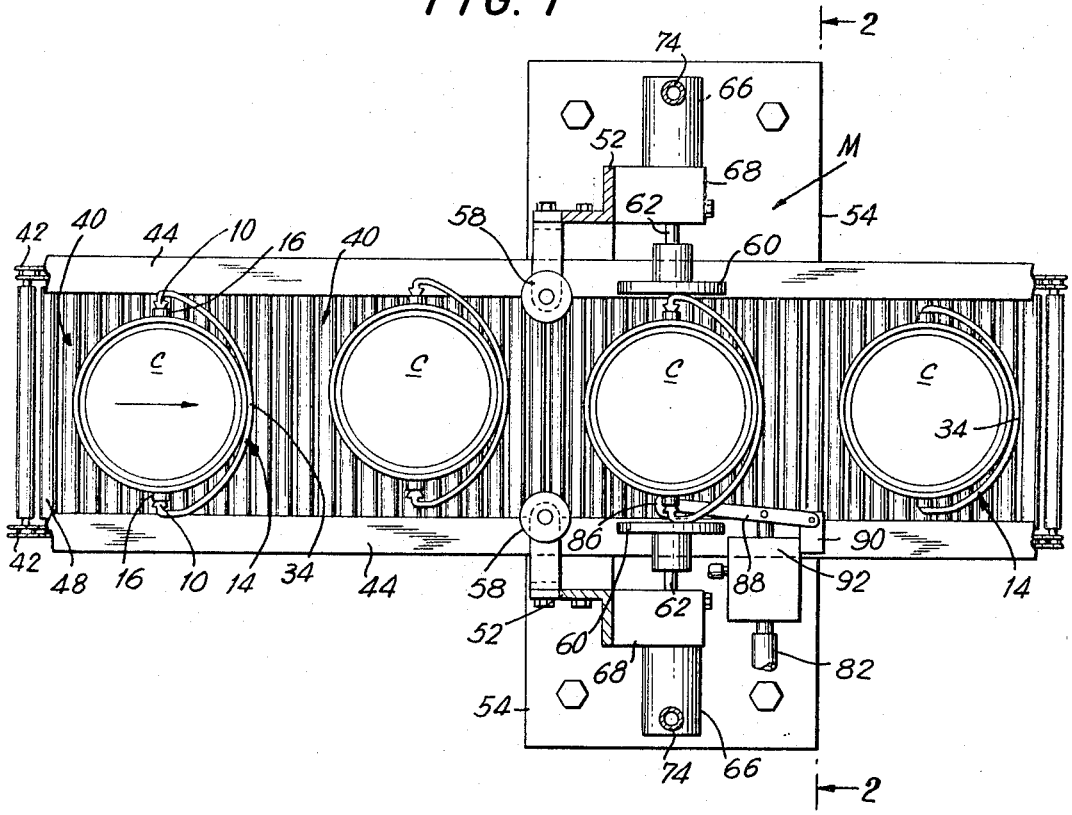
FIGURE 1 is a plan view of a machine embodying the principles of the instant invention, the view showing the various parts of the machine at a point about midway in the operating cycle of the machine.

As a preferred and exemplary embodiment of the instant invention, the drawings illustrate a machine which is designed to insert the barbs 10 which are formed at the free ends of inwardly extending hook portions 12 of generally semicircular wire bails 14 into hollow metal bail ears 16 which are attached in diametrically opposed relationship to the body walls 18 of cans C in any suitable manner, as by clinched seams 20.

Figure 3:
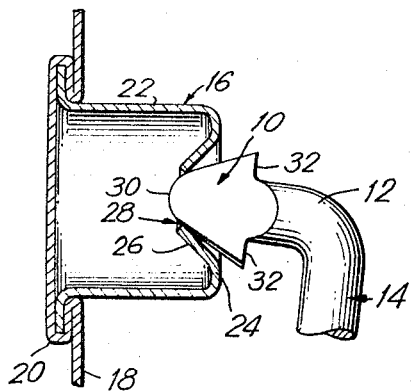
FIGS. 3 and 4 are enlarged vertical sectional details through a bail ear and bail end and taken, respectively, before and after insertion of the bail end into the bail ear.
Figure 4:
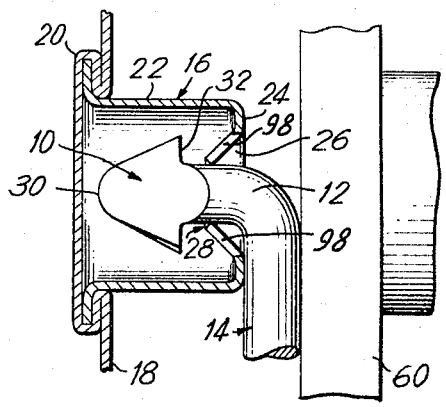

As best seen in FIGS. 3 and 4, each bail ear is formed with a cylindrical side wall 22 and a front wall 24 which is formed with an inwardly extending frustoconical pocket or indentation 26 which terminates in a centrally located circular opening 28 having a diameter somewhat less than the width of the barb 10.

Each barb 10 is formed by flattening the wire of the bail end to give it a wedge-shaped or chisel-shaped configuration so that it tapers gradually in thickness from a thin knife-like rounded front edge 30 to a pair of somewhat thicker straight shoulders 32 which project laterally from both sides of the hook portions 12.

As a preliminary step to the insertion of the barbs 10 into the ears 16 by the instant machine, the ends of the bails 14 are pulled apart and the front ends 30 of the barbs 10 are placed in the ear pockets 26 in the position shown in FIGS. 1, 2, 3 and 5. In this position, the bails are held on the cans under spring tension by the tendency of the bails to return to their original, untensioned condition due to the inherent springiness of the wire of which they are made. This preliminary positioning operation can be done either manually or by a suitable machine (not shown), and is preferably done after the cans have been filled and sealed. As a rule, gravitational force will cause the central portions 34 of the bails to contact the side walls 18 of the cans.

After the bails have thus been positioned on the cans, the cans with the assembled bails thereon are conveyed along a straight line path of travel, in the direction of the arrow in FIG. 1, by a movable conveyor 40, with the bail ears of each can disposed along a diametral line which is normal to such path of travel. The cans may be arranged in this position either manually, or by an automatic indexing device (not shown).

Figure 2:
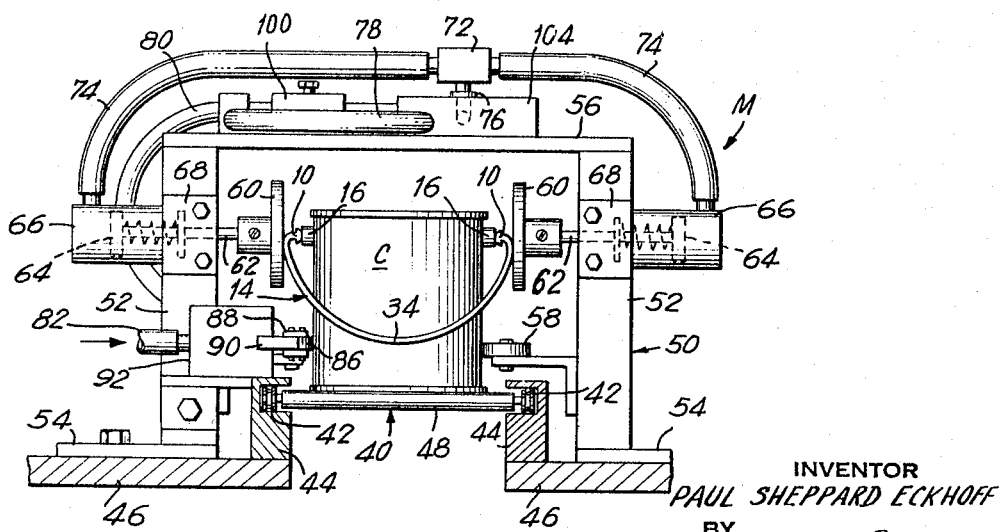
FIG. 2 is a vertical section taken substantially along the line 2—2 in FIG. 1.

The conveyor 40 preferably comprises a pair of endless chains 42, the upper flights of which are shown in FIGS. 1 and 2 and travel in a pair of track bars 44 which are mounted on a feed table 46. The cans are supported on transverse support rods 48 which are mounted in the chains 42. As the cans C are advanced by the conveyor 40, they are conveyed into and through the machine M of the instant invention which presses the barbs 10 into the bail ears 16.

The machine M comprises a frame 50 which consists of a pair of vertical legs 52 which are welded to base plates 54 bolted to the feed table 46, and a cross-plate 56 which is secured to the upper ends of the legs 52.

As each can enters the machine, it passes between and is centered on the conveyor 40, if necessary, by a pair of centering rolls 58 which are bolted to the legs 52. Continued advancement of the can brings it into alignment between a pair of pressure plates 60 which are secured to the front ends of a pair of piston rods 62 which are connected to a pair of pistons 64 which operate in a pair of pneumatic cylinders 66, which are mounted in opposition to each other on the spaced legs 52 of the frame 50, the front ends of the cylinders being provided with squared adjustable mounting brackets 68 to facilitate securement of the cylinders to the legs 52. The pistons 64 are normally held in retracted position by springs 70 so that the plates 60 are clear of the can and the bail, as seen in FIG. 5.

The cylinders 66 are connected to each other and to an air supply line via a T coupling 72 and a pair of lateral flexible tubes 74 which lead into the rear ends of the cylinders 66. The air supply line is of the usual type which is normally found in almost every manufacturing plant, and includes flexible tube sections 76, 78, 80 and 82. If necessary, a pressure reducing valve 84 may be inserted into the air line to maintain a desired constant pressure therein.

As each can passes between the plates 60, it engages and moves outwardly a trip roller 86 which is mounted on the free end of a lever 88 which is pivotally mounted on a lug 90 which is secured to the front end of a control valve 92 which is interposed between the tubes 80, 82.

Figure 5:
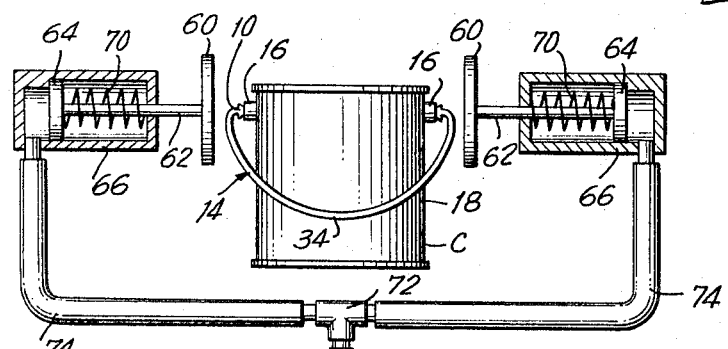
FIG. 5 is a schematic operating diagram of the various operating parts of the instant machine as they appear at the beginning of an operating cycle of the machine.
Figure 5:
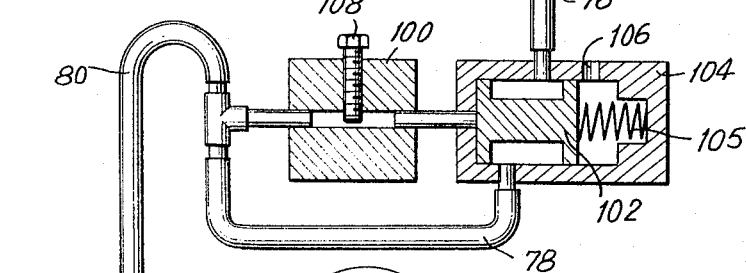
Figure 5:
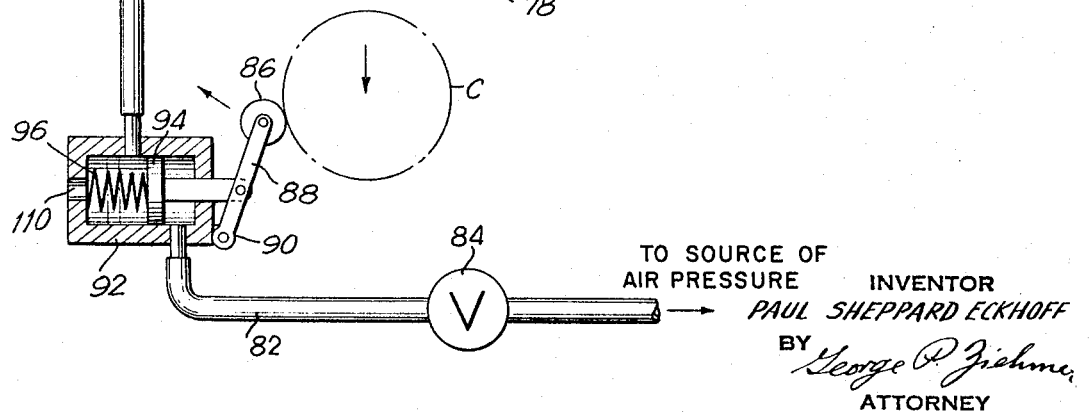

Movement of the roller 86 in the direction of the arrow in FIG. 5 by the pressure of the can results in a movement of the valve slide 94 against the pressure of spring 96 from its normal air cut-off position shown in solid lines in FIG. 5 to its open position shown in dotted lines therein, in which position communication is established between the tube 80, 82, thus permitting the flow of air under pressure into the cylinders 66. As a result, the pistons 64 are moved rapidly towards each other, thus moving the pressure plates 60 into engagement against the end portions of the bail 14 of the can which has tripped the valve 92, and which is at this time substantially centered between the plates 60, as seen in FIGS. 1 and 2. The pressure in the pneumatic system is sufficient to cause each of the plates 60 to strike the bail 14 with a sharp hammer-like blow of sufficient power to cause the wedge shaped bails 10 to cut through the metal of the pockets 26 and seat in the interior of the bail ears 16, as shown in FIG. 4. The cutting action exerted by the barbs 10 creates a pair of oppositely disposed slots 98 in each of the ear pockets 26, but because of the resiliency of the metal of the ears, these slots have a tendency to close up to some extent behind the barb shoulders 32, thus locking the barbs in the bail ears 16.

The inward motion of the barbs 10 is limited by the engagement of the bail 14 against the front bail ear walls 24, and by virtue of the positioning of the cylinders 66 so that the stroke of each plate 60 terminates when the barbs are fully seated in the bail ears, as shown in FIG. 4.

Simultaneously with the flow of air into the cylinders 66, air under pressure also flows through a bleeder valve and against one end of a slide 102 of a valve 104 which is inserted in normally flow through condition between the tubes 76, 78, as seen in FIG. 5. As a result, the slide 102 is moved, against pressure of the valve spring 105, to the right, thus cutting communication between the tubes 76, 78 and venting the tube 76 via the vent hole 106 almost immediately upon completion of the stroke of the pistons 64. The resultant dissipation of pressure in the cylinders 66 permits the springs 70 to snap the pistons 64 to retracted position, thus withdrawing the plates 60 from engagement with the bail.

The timing of the movement of the slide 102, which is controllable by adjustment of the bleeder valve screw 108, is such that the pressure plates 60 remain only momentarily in contact with the bail 14, so that the movement of the can through the machine is not halted to any appreciable extent.

After the insertion of the barbs 10 has thus been effected, the continued movement of the can moves it out of engagement with the roller 86, thus permitting the valve slide 94 to be moved by the spring 96 to shut-off position, in which position the tube 80 is vented through vent port 110. This breaks the air pressure in the bleeder valve 100, thus permitting the spring 105 to move the slide 102 to the position shown in FIG. 5, thus completing the cycle of the machine and resetting it for the next can.

It is thought that the invention and many of its attendant advantages will be understood from the foregoing description and it will be apparent that various changes may be made in the form, construction, and arrangement of the parts without departing from the spirit and scope of the invention or sacrificing all of its material advantages, the form hereinbefore described being merely a preferred embodiment thereof.

I claim:

1. A machine for attaching a can bail having cutting barbs on the ends thereof to a can, comprising a pair of pressure members disposed in spaced relationship to each other, and means for simultaneously moving said pressure members towards each other and into pressured bail-inserting engagement with the sides of the bail when a can having the said bail temporarily engaged on its bail ears and travelling between said pressure members comes between said pressure members to drive said barbs to cut through and become retained within said ears.

2. A machine for inserting can bails having cutting barbs on the ends thereof into the bail ears of cans as the cans are conveyed along a predetermined path of travel with the barbs temporarily engaged on their bail ears, comprising a pair of pressure members disposed in lateral alignment with each other on opposite sides of said path of travel, and pressure means for moving said pressure members through an operating stroke towards each other into engagement with the sides of a bail to drive the bails to cut through the bail ears of a can when the can moves into alignment with the pressure members to permanently secure the bail to the can, and means for quickly moving said pressure members through a return stroke so that the travel of said cans is not impeded.

3. The machine of claim 2 wherein means for actuating the pressure means are provided, said actuating means being actuatable by a can as the latter moves along said path of travel.

4. The machine of claim 3 wherein the pressure means comprise fluid actuated cylinders.

5. The machine of claim 4 wherein the pressure means comprise air cylinders and the actuating means comprise a valve for introducing air into said cylinders.

6. The machine of claim 5 wherein means are provided for venting said cylinders at the completion of their operating stroke, and wherein spring means are provided to return said cylinders to their initial positions.

7. The method of applying a bail to a container comprising the steps of providing a can body having a pair of bail ears on the side wall thereof, said ears having bail receiving means formed in their outer walls disposed in opposed relationship thereon, providing a U-shaped bail having inwardly extending flat cutting barbs formed at the ends thereof with the spacing between the portions of said bail adjacent to and generally perpendicular to said barbs being less than the spacing between the outer walls of the bail ears, pulling the legs of the bail apart to increase the spacing between the barbs, placing the inner ends of the barbs in the bail receiving means of the bail ears, releasing the legs of the bail to preliminarily position the bail on the can body and forcing the cutting barbs inwardly to cut through the outer walls of the bail ears to place said barbs within said bail ears but spaced from said side wall and thereby permanently seat the bail on the can body.

8. The machine defined in claim 1 further comprising a pair of vertical legs, a member joining said legs and maintaining them in spaced relationship with respect to each other, each of said pressure members being mounted on one of the legs.

9. The machine defined in claim 2 wherein said pressure members are substantially flat plates.

References Cited

UNITED STATES PATENTS

| 703,205 | 6/1902 | Hodgson | 113—1 |
| 1,962,286 | 6/1934 | Schrader | 113—120 |
| 3,192,960 | 7/1965 | Woodward | 140—93 |
| 3,195,228 | 7/1965 | Beacham | 140—93 |
| 3,241,578 | 3/1966 | Heisler | 140—93 |

RICHARD J. HERBST, *Primary Examiner.*

UNITED STATES PATENT OFFICE
CERTIFICATE OF CORRECTION

Patent No. 3,380,418                         April 30, 1968

Paul Sheppard Eckhoff

It is certified that error appears in the above identified patent and that said Letters Patent are hereby corrected as shown below:

Column 1, line 25, "application" should read -- applications --; line 26, after "abandoned," insert -- and Serial No. 562,426 filed June 27, 1966, now Patent No. 3,358,877, --.

Signed and sealed this 30th day of September 1969.

(SEAL)
Attest:

Edward M. Fletcher, Jr.                      WILLIAM E. SCHUYLER, JR.

Attesting Officer                             Commissioner of Patents